United States Patent [19]

Jacobi et al.

[11] 4,326,013
[45] Apr. 20, 1982

[54] ENERGY SYSTEM

[76] Inventors: Edgar F. Jacobi, 5N 754 Jens-Jenson, St. Charles, Ill. 60174; Mark R. Madden, Rte. #2, Plainsfield, Wis. 54966

[21] Appl. No.: 207,658

[22] Filed: Nov. 17, 1980

[51] Int. Cl.³ .............................................. H01M 8/18
[52] U.S. Cl. ....................................... 429/20; 429/26; 429/120; 204/129; 137/899
[58] Field of Search .................. 429/20, 13, 17, 26, 429/120; 204/129; 406/39, 41; 137/344, 899, 340

[56] References Cited

U.S. PATENT DOCUMENTS

| | | | |
|---|---|---|---|
| 3,359,041 | 12/1967 | Corbett-Smith et al. | 406/39 X |
| 3,797,744 | 3/1974 | Smith | 137/899 X |
| 3,929,154 | 12/1975 | Goodwin | 137/899 X |
| 4,001,041 | 1/1977 | Menard | 429/20 X |
| 4,037,024 | 7/1977 | Landau | 429/26 X |
| 4,216,067 | 8/1980 | Mitchell | 204/129 |
| 4,254,190 | 3/1981 | Zaromb | 429/26 X |

Primary Examiner—Charles F. LeFevour
Attorney, Agent, or Firm—I. Michael Bak-Boychuk

[57] ABSTRACT

A central photovoltaic collection array is used on a shared basis to recharge transportable fuel cell trailers each provided with an electrolysis cell. The electrolysis cell is fed by a container of water and when connected to the array the water is broken down into the constituent elements. The resulting oxygen is stored under pressure while the hydrogen is fed to a reactive bed to form metallic hydride. The heat of reaction of the metallic hydride is cooled by a heat exchanger immersed in the bed and connected between two insulated containers of water. Thus the water warmed up in the course of cooling the metallic hydride reaction is returned to an insulated chamber and in this manner serves as a source of heat for the decomposition thereof when hydrogen is desired. Once some hydrogen is released the heat of combination with oxygen may be used to continue the decomposition and as a source of power.

8 Claims, 2 Drawing Figures

ENERGY SYSTEM

BACKGROUND OF THE INVENTION

1. Field of the Invention

The present invention relates to fuel penetrating systems, and more particularly to transportable fuel cells which are repetitively recharged.

2. Description of the Prior Art

In many remote locations demands for portable power frequently occur. Such demands, however, most often entail power levels of high concentration which are best accommodated through the burning of fuel. For example, as the demands of food production increase concurrent with the decreases in readily available fossil fuel sources, more and more research is directed to the use of solar energy as the power source for irrigation. Similarly solar power is now more often viewed as the only realistic alternative for many other power applications.

The ambient power levels of solar radiation, however, are typically much lower than that needed to operate any practical equipment. Thus concentration or use of arrays having large collecting surfaces is a necessary incident to solar power, a feature best achieved on a shared or collective basis. Accordingly, one now sees large collection facilities installed on an experimental basis throughout the sunbelt, each financed by public funds. These collectors develop power which is directly related to the weather and time of day and which does not respond to the demand peaks that occur as result of popular habits.

Accordingly, incident to all of these large collection arrays is the problem of effective power storage and, furthermore, the problem of efficient power transfer to the location of need. It is the practical solution of these last problems that is achieved herein.

Accordingly, it is the general purpose and object of the present invention to provide a transportable fuel cell system which may be periodically recharged at a central solar collector.

Other objects of the invention are to provide a safe transport arrangement for hydrogen and oxygen made available through the electrolysis of water.

Yet further objects of the invention are to provide a convenient transport system for transferring power to selected remote locations.

SUMMARY OF THE INVENTION

Briefly these and other objects are accomplished within the present invention by providing a moveable platform similar to a trailer now used on the highway, the platform supporting two insulated water chambers and a bed for storing metallic hydride. Included further on the trailer is a container for storing oxygen under pressure and the necessary pumping arrangement therebetween.

In order to recharge this transportable fuel storage system the trailer is brought to a solar collection facility where the oxygen tank is fed by the oxygen output of an electrolysis cell while the hydrogen is fed to the metallic hydride bed. During this time the electrolysis cell is fed water from the water chambers which also is passed through a heat exchanger inside the bed to cool the heat of reaction. Part of the water thus heated through the heat exchanger is then stored in one of the insulated chambers and is available to start the decomposition of the metallic hydride. Once decomposition is begun the free hydrogen and oxygen may then be combined in a fuel cell which sustains the further release of hydrogen by recirculting some of the heat of combination therein.

This process may then be maintained for the duration desired or until both the elements are exhausted. The water produced in the course of the combination in the fuel cell may then be returned to the trailer for reuse.

DESCRIPTION OF THE SPECIFIC EMBODIMENT

Figure 1:
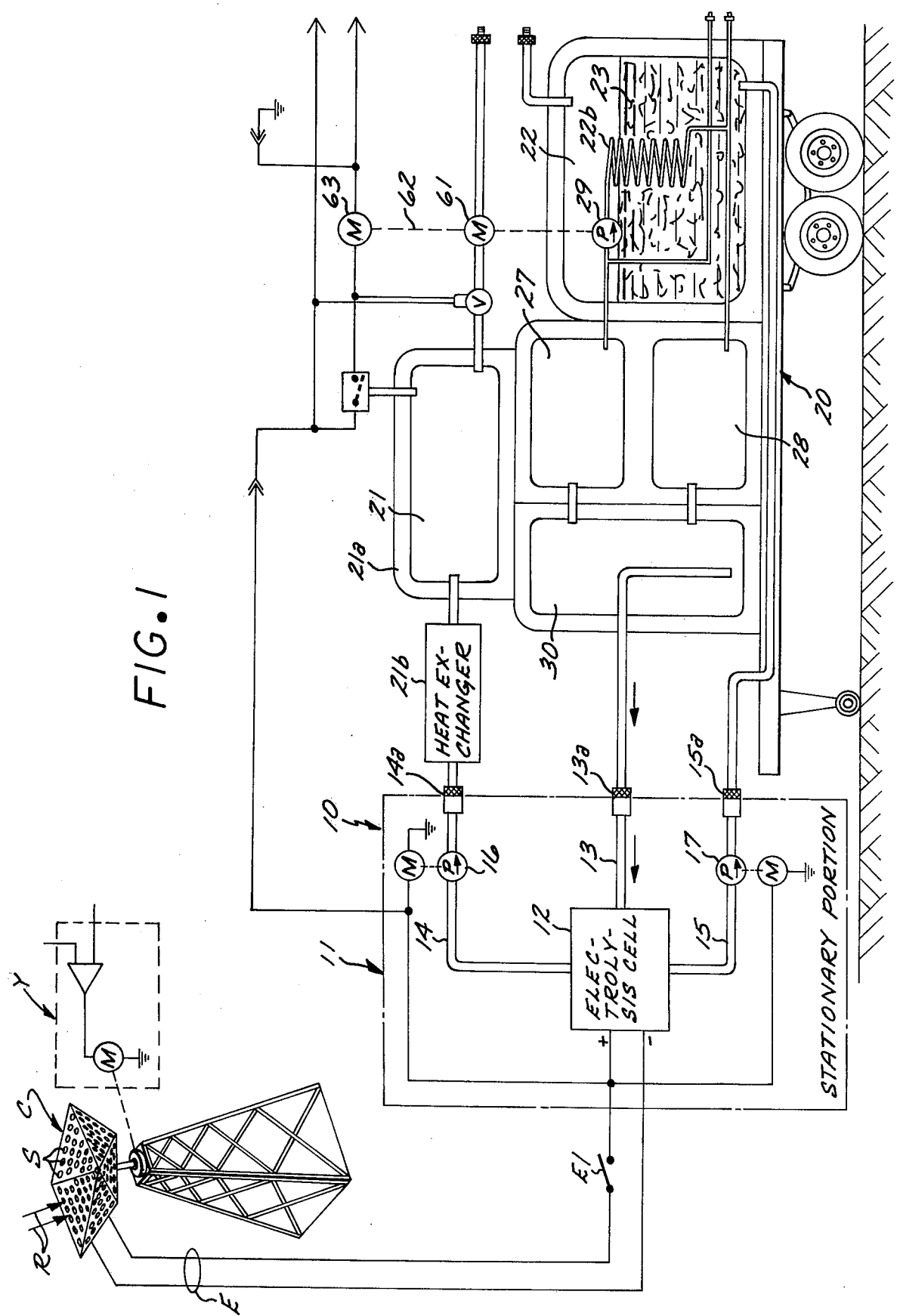
FIG. 1 is a diagrammatic illustration of a trailer assembly provided with the inventive power storage system and connected for recharging.

As shown in FIG. 1 a solar collector C provided with a plurality of solar cells S is conventionally aligned to receive solar radiation R which, through the known effects of the photovoltaic process generate a DC potential E. As is known by those skilled in the art the electrical power thus developed depends on the number or area of the cells S and the alignment angle relative the sun. By selective interconnection of the photo cells S both the current and voltage levels may thus be controlled, the collector C being conventionally articulated by a control system Y for optimum solar alignment.

As is well known in the art the electrical total power can be effectively increased by increasing the size of the collector C (and therefore the number of cells S). Through collective or shared efforts the size of the array C may thus be provided which supplies power at densities sufficient to meet the anticipated average demands.

The electrical power E may then be selectively applied through a switch E1 to a fuel cell system generally designated by the numeral 10 comprising a stationary portion 11 conformed around an electrolysis cell 12. This electrolysis cell 12, in a manner known in the art, separates the hydrogen and oxygen elements in the water received through a flexible conduit 13. The oxygen ($O_2$) is then transferred through a conduit 14 to the input side of a compressor 16. Similarly the free hydrogen ($H_2$) is conveyed through a conduit 15 to the input of a compressor 17. The foregoing flow arrangement may terminate at quick disconnection fittings 13a, 14a and 15a which respectively terminate the other end of conduit 13 and the output sides of compressors 16 and 17.

Concurrent with the excitation of the electrodes in cell 12 the power E may be applied to the foregoing compressors 15 and 17 which thus raise the operating pressure of the free oxygen and hydrogen. The oxygen and hydrogen are then received, under pressure, in a pressurized oxygen tank 21 and a metallic hydride container 22, respectively, both mounted on a wheeled trailer assembly 20. The oxygen tank may include a layer of insulation 21a around its exterior for reducing the heat input thereto and the inlet ducting to this tank may be provided with a heat exchanger 21b through which the heat of pressurization may be lost to the atmosphere. Similarly, the hydride container 22 may be provided with a heat exchanger 22b mounted on the interior thereof and disposed in a bed of metallic strands of shavings 23 which react with the free hydrogen ($H_2$) introduced into the container to form metallic hydride (MH₂) according to well known chemical reactions (see, for example, February 1980 issue of Scientific American Pgs. 118 to 129). The heat exchanger 22*b* extends between two insulated water chambers 27 and 28 and circulates water therebetween according to the direction of a reversible pump 29 connected in series therewith.

It is to be understood that the reaction forming matallic hydride is exothermic. Its decomposition, however, is endothermic. Thus, by appropriately transferring water between the chambers 27 and 28*a* volume of water heated by the metallic hydride reaction will remain to initiate the decomposition cycle once the trailer 20 is moved to the desired location.

Figure 2:
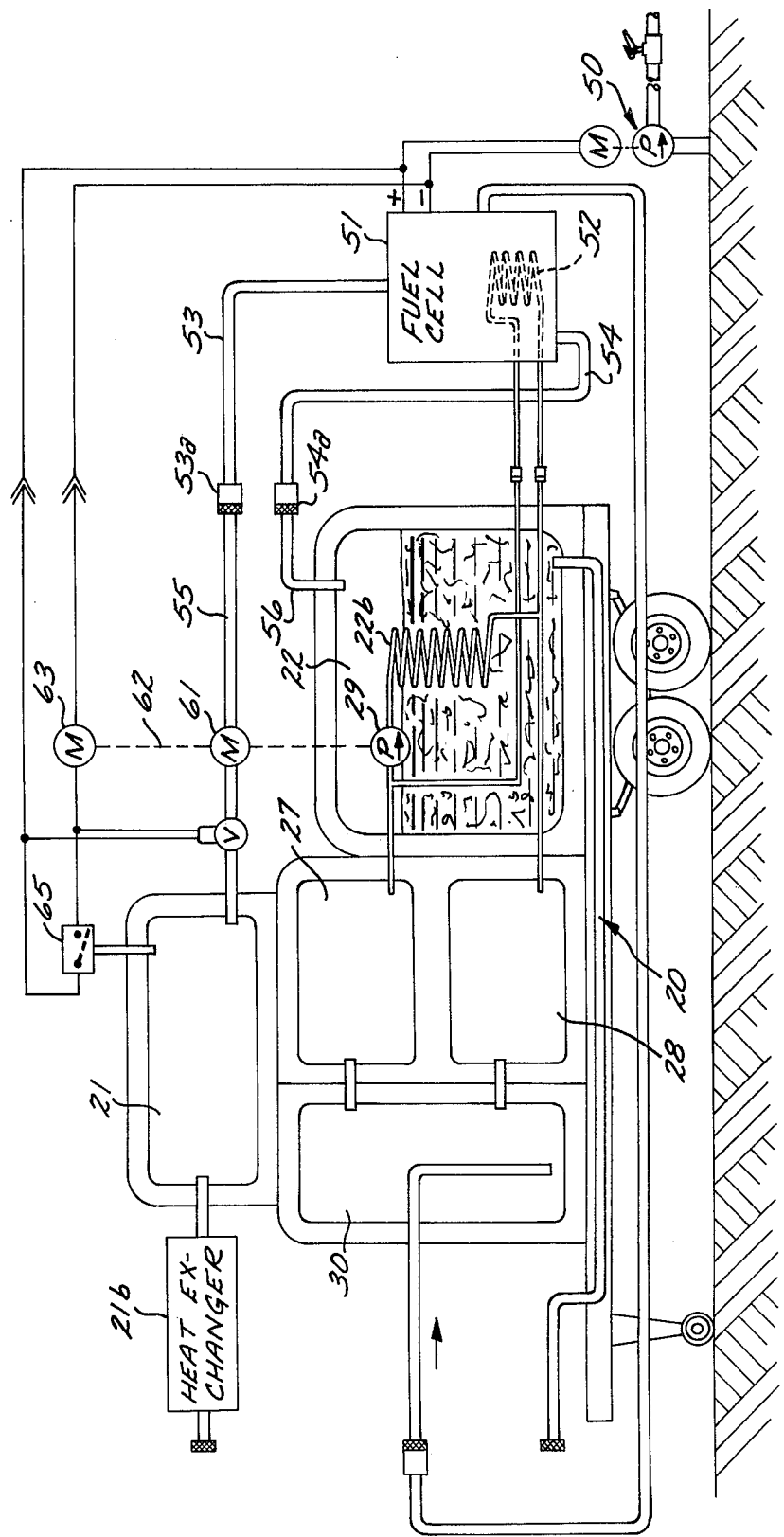
FIG. 2 is a diagrammatic illustration of the trailer assembly of FIG. 1 connected to produce power.

As shown in FIG. 2 the trailer assembly 20, once charged, may then be moved to a location where power is needed, illustrated by way of example and not limitation, as a remote irrigation pumping station 50. Pumping station 50 includes a fuel cell 51 which includes on the interior thereof a heat exchanger 52 for cooling the heat of reaction. Fuel cell 51 includes an oxygen (O₂) input conduit 53 and a hydrogen (H₂) input conduit 54. Conduits 53 and 54 terminate in quick disconnect fittings 53*a* and 54*a* conformed to engage the outlet ends of an oxygen output pipe 55 and a hydrogen pipe 56. Oxygen pipe 55 communicates with the interior of the oxygen tank 21 across an air motor 61. Air motor 61 is mounted on a shaft 62 which is also engaged to an electrical motor 63 and which extends to drive the pump 29. The electrical motor, furthermore, is excited by the dc power output from the fuel cell 51, the connection being made across a pressure switch 65 which is rendered open upon the depletion of the oxygen tank 21.

The hydrogen pipe 56 extends into the ullage area of the hydride container 22 and thus receives the hydrogen released in the course of decomposition. This release is first initiated by routing the flow through exchanger 22*b* to pump the warm water therethrough. Once initiated further decomposition is sustained by connecting the fuel cell heat exchanger 52 across the exchanger 22*b* and the heat of combination in the fuel cell will thus continue the process. Concurrently the water product of the combination may be routed back to the disconnect fitting 13*a* to be collected in a storage chamber 30 which both feeds the electrolysis process and serves as a catch basin for trapping any spill over from chambers 27 and 28.

While the foregoing arrangement is illustrated in conjunction with an irrigation system it is to be understood that the same features may be used for other purposes. For example, the fuel cell may be mounted for transport and may be used to drive the vehicle. Furthermore, either manual or automatic controls may be implemented for extending or matching the power output to the power demands.

In this manner the relatively low density of solar radiation may be concentrated for the occasional high density requirements.

Within the foregoing arrangement electric motor 61 is reversible. Accordingly, when the trailer 20 is brought for recharging, as illustrated in FIG. 1, the connections of the power output E may be such as to reverse the flow direction through the heat exchanger 22*b*. In this manner full recovery is possible without any loss of water in the process.

Obviously many modifications and changes may be made to the foregoing description without departing from the spirit of the invention. It is therefore intended that the scope of the invention be determined solely on the claims appended hereto.

What is claimed is:

1. A transportable storage system conformed to transfer hydrogen and oxygen produced in the course of photovoltaic electrolysis of water, comprising:
    a movable platform;
    a first and second insulated coolant chamber mounted on said platform and storing coolant therein;
    a container housing metallic fibers mounted on said platform;
    a tank for storing gas under pressure mounted on said platform;
    conveying means selectively connected to transfer said hydrogen and oxygen to said container and tank;
    a first heat exchanger received in said container; and
    circulating means for transferring water through said first heat exchanger from said first to said second chamber during the course of said transfer by said conveying means.

2. Apparatus according to claim 1 further comprising:
    combining means selectively connected to said container and tank for combining said hydrogen and oxygen therein; and
    a second heat exchanger mounted in said combining means and adapted for selective connection to said first heat exchanger concurrent with the connection of said combining means.

3. Apparatus according to claim 2 wherein:
    said circulating means includes reversing means connected to transfer coolant from said second to said first chamber upon the connection of said combining means to said tank and container.

4. Apparatus according to claim 3 wherein:
    said combining means comprises a fuel cell.

5. Apparatus according to claim 4 wherein:
    said reversing means comprises a reversible electric motor.

6. Apparatus according to claim 1 wherein:
    said tank and container include insulation around the exterior thereof.

7. Apparatus according to claim 6 wherein:
    said conveying means includes compressors for pressurizing said oxygen.

8. Apparatus according to claim 7 wherein:
    said circulating means includes an air motor connected to said tank and engaged to said electric motor.

* * * * *